Patented July 25, 1939

2,167,345

UNITED STATES PATENT OFFICE 2,167,345

DIESEL FUEL AND METHOD OF IMPROVING SAME

George S. Crandall, Woodbury, Robert C. Moran, Wenonah, and Henry G. Berger, Woodbury, N. J., assignors to Socony-Vacuum Oil Company, Incorporated, New York, N. Y., a corporation of New York No Drawing. Application December 9, 1936, Serial No. 114,942

7 Claims. (Cl. 44—9)

This invention has to do with fuels for internal combustion engines of the Diesel type, and is concerned with the modification of such fuels by the addition of characterizing ingredients for the purpose of modifying and/or controlling the combustion characteristics of the fuel.

The requirements of a Diesel cycle engine call for a fuel whose ignition and combustion characteristics are the opposite of those usually desired in an Otto cycle internal combustion engine as typified by the usual spark-ignition gasoline engine. The desired combustion in an ordinary gasoline engine is one of a controlled or controllable slowness, since too rapid ignition causes the phenomena usually characterized by the inclusive term "knocking". In the Diesel cycle engine, the desired characteristics are diametrically opposite, and enhanced speed of ignition is desired. Here the fuel is injected into a combustion space and it may exert maximum efficiency only when the delay period between injection and ignition is as short as possible. Improperly delayed ignition in a Diesel engine also gives rise to phenomena known as "knocking" due to improper coordination of combustion phenomena and cylinder conditions, although the reason for such knocking is the reverse of that for knocking in gasoline engines of ordinary type.

This invention has to do with the use of novel characterizing ingredients in Diesel fuel tending to promote rapidity of combustion and so control the characteristics of the fuel.

This invention has for its object the improvement of Diesel fuels by the addition of certain compounds whose presence in small quantities promotes the rapidity of combustion of such fuels.

The novel Diesel fuels herein disclosed are characterized by the presence of small amounts of organic disulphides, such as, for example, certain alkyl disulphides, dibenzyl disulphide, the disulphide products produced by dissolving common mercaptans in Diesel fuel and then subjecting the fuel to a "sweetening" or "doctor" treatment, and disulphide mixtures produced by similar methods, and comprises not only the distillates of the kerosene-like boiling range commonly denoted as Diesel fuel, but extend as well into the field of hydrocarbon products both heavier and lighter, as, for example, light and heavy fuel oils for use in Diesel engines.

Knocking characteristics of gasoline for use in Otto cycle engines of ordinary type are normally expressed in terms of octane number, after an accepted usage in the art. Knocking characteristics of Diesel fuel are at present best expressed by "cetene" numbers. The cetene number is the per cent by volume of cetene in a blend of cetene and alphamethylnaphthalene, which blended fuel has the same combustion characteristics as the fuel under test. (Boerlage and Broeze, Journal Soc. Automotive Eng. 31, No. 1, 283-293, 1932.) An increase in cetene number indicates a decrease in delay between fuel injection and fuel ignition and consequently indicates a betterment in fuel combustion characteristics.

A number of compounds have been proposed as ignition accelerators for Diesel fuels. Among them are such materials as various nitrogen compounds, certain aldehydes and peroxides, and some organic sulphides and tetrasulphides. Many of these compounds are unsuitable from a standpoint of stability, cost, toxicity, or tendency to form corrosive substances.

According to the present invention, Diesel fuels may be highly improved in combustion characteristics by the addition of materials of the nature of organic disulphides, either by addition of the compound as such, by solution of a mercaptan or mercaptan mixture in the fuel, followed by "doctor" treatment of the fuel solution, or by certain equivalent methods hereinafter discussed.

For example, according to this invention, a Diesel fuel for use in a compression ignition engine, may be improved by the addition of small amounts of specific compounds such as diethyl disulphide, di-iso-amyl disulphide, dibenzyl disulphide, diphenyl-disulphide, di-beta-naphthol disulphide, and the like. These characterizing ingredients when used in small amounts, give rise to significant increases in the cetene number of the Diesel fuel, which result is not obtained, for example, with certain corresponding monosulphides. These compounds are not corrosive to copper as is the case with free sulphur or tetrasulphides.

The same characteristic results may be obtained to an enhanced degree by dissolving corresponding mercaptans in the fuel to be improved, and then subjecting the fuel, which becomes "sour" after this treatment, to the common "doctor" sweetening process, wherein the mercaptans are altered by reaction with sodium plumbite and sulphur to complex compounds of the nature of disulphides which remain dissolved in the oil.

A very important and economical method by which this invention may be accomplished, comprises the steps of contacting the fuel to be improved with a spent caustic liquor which has been used in washing raw gasoline distillates, and is saturated with compounds of a mercaptan-like nature, in the presence of sufficient sulphur to accomplish the simultaneous conversion of the mercaptan bodies to disulphide bodies soluble in the oil. Not only does this process make use of a convenient and economical source of disulphides from a product which is otherwise a refinery waste, but very great improvements are readily obtainable in the combustion character of the fuel without the introduction of undesirable qualities.

As an example of the efficiency of the ingredients and methods herein disclosed for the improvement of Diesel fuels, the following tests are noted, in which the specified ingredients were added, or the specified methods were practiced, to a distillate Diesel fuel of the type commonly known as No. 2 furnace oil, having a specific gravity of 0.8403, a flash point of 152° F., and a Lovibond color of about 1.5. The tests were made by comparison with standard reference fuels in a C. F. R. Diesel engine, using the ignition delay method. Results are expressed in cetene numbers.

Table

|  |  | Cetene number | Increase |
|---|---|---|---|
| I | Fuel oil alone | 50.5 | |
| II | Oil+0.5% diethyl disulphide | 54.0 | 3.5 |
| III | Oil+0.4% di-iso-amyl disulphide | 53.5 | 3.0 |
| IV | Oil+0.2% dibenzyl disulphide | 53.5 | 3.0 |
| V | Oil+0.5% dibenzyl disulphide | 55.0 | 4.5 |
| VI | Oil+5.0% dibenzyl disulphide | 60.0 | 9.5 |
| VII | Oil+1.0% diphenyl disulphide | 53.0 | 2.5 |
| VIII | Oil+0.5% di-beta-naphthol disulphide | 53.5 | 3.0 |
| IX | Oil+0.4% iso-amyl mercaptan, then sweetened | 56.0 | 5.5 |
| X | Oil+4 volumes spent caustic wash sweetened | 60.0 | 9.5 |

From the tests numbered I to VIII inclusive, wherein varying amounts of specific organic disulphides were added, it will be noted that appreciable increases in cetene number were obtained. These may be contrasted with a test wherein the addition of 2.0% of dibenzyl-monosulphide, to the same stock, failed to give any measurable increase in cetene number. The above series of tests also shows how enhanced results may be obtained by dissolving a mercaptan, as isoamyl mercaptan, in the fuel oil, and then subjecting the oil to the "doctor" treatment, this method having been used in preparing the oil tested in test IX, whereas test III reports the test on oil to which the specific compound has been added. Most striking, in the above series of tests, is that reported in test X, wherein the fuel oil was contacted with 4 volumes of spent caustic obtained from the caustic washing of raw gasoline distillate, and then sweetened, resulting in an increase in cetene number of 9.5.

The novel combustion improving compounds of this invention; viz., organic disulphides, may be added to the fuel in any amounts up to between 5% and 10% of the fuel, although the preferred concentration is approximately 2% by weight.

In the following claims, the term "Diesel fuel" means any, and includes all, types of hydrocarbon products intended for use in any engine operating according to the compression ignition or Diesel cycle.

We claim:

1. An improved Diesel fuel comprising a mineral hydrocarbon fuel, in which has been dissolved a small proportion of a mercaptan, the mercaptan-containing fuel having then been sweetened in the presence of sulphur, resulting in a decrease in the ignition delay period of the fuel.

2. An improved Diesel fuel comprising a mineral hydrocarbon fuel which has been contacted with spent caustic wash liquors from the washing of sour raw petroleum distillate and sweetened in the presence of sulphur, resulting in a decrease in the ignition delay period of the fuel.

3. A method for decreasing the ignition delay period of a Diesel fuel, comprising the steps of dissolving mercaptans in the Diesel fuel to be treated and sweetening the fuel in the presence of sulphur.

4. A method for decreasing the ignition delay period of a Diesel fuel, comprising contacting the fuel to be treated with spent caustic wash liquors derived from the washing of sour raw petroleum distillate and sweetening the fuel in the presence of sulphur.

5. An improved Diesel fuel comprising a mineral hydrocarbon of the Diesel fuel type in which the disulfide content has been increased beyond that obtainable by merely sweetening the hydrocarbon in the presence of sulfur, such increase having been obtained by dissolving mercaptans in the hydrocarbon and then sweetening in the presence of sulfur.

6. An improved Diesel fuel comprising a mineral hydrocarbon fuel having in admixture therewith a minor proportion of an improving agent predominantly of the nature of organic disulfides obtained by sweetening mercaptans in the presence of sulfur, the quantity of the disulfide improving agent present in said fuel being greater than that which could be obtained by sweetening the fuel alone and sufficient to substantially decrease the ignition delay period of the fuel.

7. An improved Diesel fuel comprising a mineral hydrocarbon fuel having in admixture therewith a minor proportion of an improving agent predominantly of the nature of organic disulfides obtained by sweetening in the presence of sulfur the spent caustic wash liquors from the washing of sour petroleum distillate, the quantity of the disulfide improving agent present in said fuel being greater than that which could be obtained by sweetening the fuel alone and sufficient to substantially decrease the ignition delay period of the fuel.

GEORGE S. CRANDALL.
ROBERT C. MORAN.
HENRY G. BERGER.